United States Patent [19]

Cherry et al.

[11] Patent Number: 4,792,666
[45] Date of Patent: Dec. 20, 1988

[54] BAR CODE READER WITH COMPENSATION FOR SIGNAL VARIATION ON DIFFERENT SCAN LINES

[75] Inventors: Craig D. Cherry, Eugene; P. Guy Howard, Junction City, both of Oreg.

[73] Assignee: Spectra-Physics, Inc., San Jose, Calif.

[21] Appl. No.: 913,729

[22] Filed: Sep. 30, 1986

[51] Int. Cl.⁴ .............................................. G06K 7/14
[52] U.S. Cl. .................................... 235/466; 235/454; 235/462
[58] Field of Search ............... 235/435, 454, 462, 463, 235/466, 472

[56] References Cited

U.S. PATENT DOCUMENTS

| | | | |
|---|---|---|---|
| 3,891,829 | 6/1975 | Dobea | 235/466 |
| 4,289,957 | 9/1981 | Neyroud et al. | 235/467 |
| 4,409,469 | 10/1983 | Yasuda et al. | 235/467 |

Primary Examiner—A. D. Pellinen
Assistant Examiner—Jeffrey A. Gaffin
Attorney, Agent, or Firm—Donald C. Feix; Paul Davis; T. M. Freiburger

[57] ABSTRACT

A method and apparatus for obtaining a more uniform output signal strength among various scan lines of a multiple scan line laser bar code reader involves switching of the gain level in the return signal amplifier of the bar code reader apparatus, in accordance with the position of the laser beam in the scanning sequence and in accordance with known information relating to the relative response that can be expected from each different scan line. This enables a better uniformity in signals from the reading of bar codes, regardless of which scan line was used to read the code, by compensating for inevitable variations in return signal strength on different scan lines, particularly in a shallow-profile slot scanner.

10 Claims, 1 Drawing Sheet

BAR CODE READER WITH COMPENSATION FOR SIGNAL VARIATION ON DIFFERENT SCAN LINES

BACKGROUND OF THE INVENTION

The invention relates to laser bar code readers, an particularly to readers that scan a laser beam in a sequence of more than one scan line.

Laser bar code readers have been in increasing use, including the slot scanners in supermarkets wherein a single beam is directed by moving mirrors over a sequence of a number of scan lines, often several non-parallel pairs of scan lines.

Hand held laser bar code readers are also in wide use, particularly in warehouses for inventory control, identification of goods, etc.

A characteristic of these multiple-line scanners is the tendency in the reading of bar codes for the return signal to vary depending on which scan line reads the code, due largely to aperture effects on the strength of return beam. The sensitivity of the received light depends on the angle of the beam and the angle of the label. The angle of the beam is inherent in the scanning mechanism, and varies with different slots. The problem is particularly acute with shallow, low-profile slot scanners, which may include critically steep angles on some scan lines.

Also affecting the received signal strength is the angle at which the surface bearing the bar code is held at the instant of reading in a supermarket slot scanner, as well as variations in reflected light and other ambient light conditions.

Little can be done to compensate for gross variations in the angle of the product and in light conditions, but a much greater uniformity in the return signals can be acheived by addressing the problem of the varying strength corresponding to different scan lines.

Automatic gain control generally is not practical in this situation because response time must be extremely fast. Automatic gain control is a following system, but what is needed is to predict the signal strength differences due to scan position before they occur.

It is therefore an object of the present invention to predict and compensate for such variations through a simple and efficient system for adjusting the output signal strength of a bar code reader in accordance with the position of the beam in the scanning sequence at the time a bar code is read.

SUMMARY OF THE INVENTION

The present invention acheives this object by coupling the scan mechanism of the laser scanner to a switching apparatus which changes the gain of the received signal amplifier in accordance with the position of the beam in the scanning sequence.

The implementation of this gain switching can take a number of different forms. In one preferred embodiment of the invention, the position of the beam in the sequence is sensed by the position of the rotating element or wheel producing the scanning action. A "start" position of the wheel can be detected by the apparatus of the invention photoelectrically, identifying that position as the beginning of the scanning sequence. From that position, the apparatus can detect or time each shift from one scan line to another. This can be achieved by timing the cycle or sequence and dividing the rotation of the wheel into a fixed number of periods in accordance with the segment of time required for each scan line, or by photoelectrically sensing the beam as it scans through the dead spaces at the end of each scan.

In any event, the position sensing or counting apparatus is connected to a control device which effects switching of the reader system's amplifier to shift the amplifier to different gain levels in accordance with the position of the beam in the sequence and with known information from prior experience or calibration testing regarding expected variations in return signal strength with different positions in the scan sequence.

The reader system's amplifier has a switched gain section which is controlled in synchronization with the scanning wheel to set a suitable gain for each scan line. In this way a more uniform signal height is acheived to help the process of reading the bar codes.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
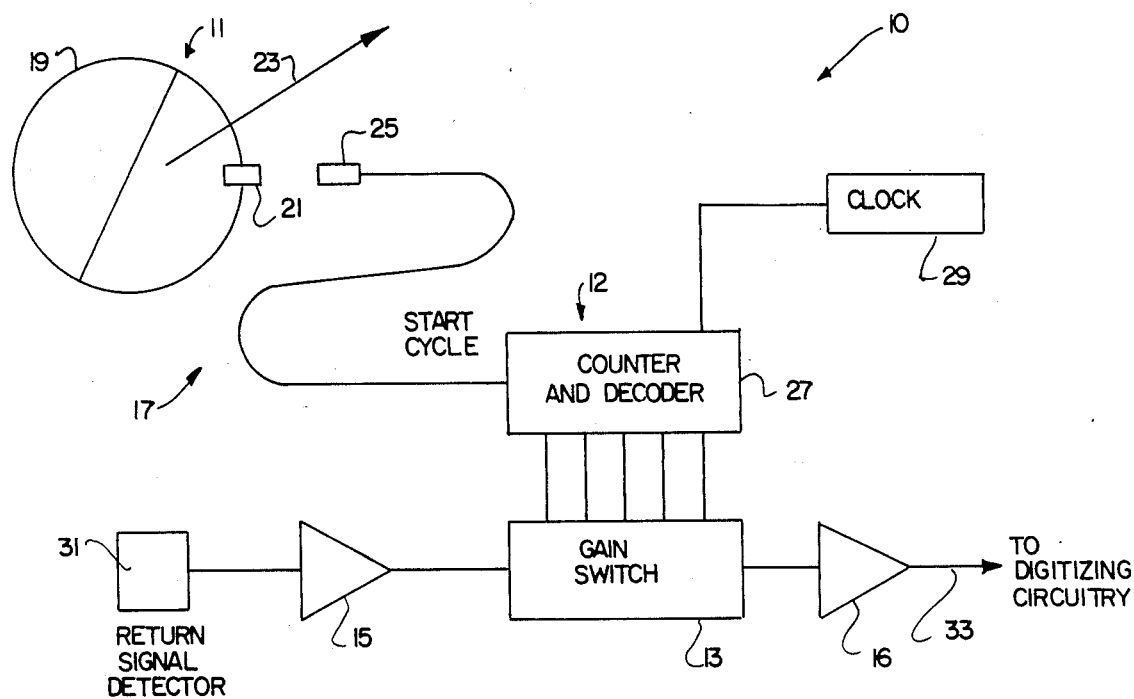
FIG. 1 is a schematic diagram indicating circuitry for implementing the principles of the invention.

In the drawings, FIG. 1 shows a system 10 in accordance with the invention for switching the gain in a bar code signal amplifier in accordance with the particular scan line on which the bar code is being read. The major components of the system are a scan position detector system 11, a switching control 12 connected to the position detector system 11, and a gain switch 13 connected to a signal preamplifier 15 of the bar code reader assembly, which is generally identified by the reference number 17. A further amplifier 16 amplifies and buffers the signal before going to digitizing circuitry, as indicated.

As indicated in FIG. 1, the bar code reader system 17 will include some reciprocating or rotating component for effecting the manipulation of the laser beam through the sequence of scan lines. In the example shown, the component may be a rotatable wheel 19 which may, for example, make one rotation to effect one cycle of movement of the laser beam through the complete scanning sequence.

The scanning wheel 19 may include a marker point 21 at a particular location on its circumference, representing a "start" position, but which may comprise any arbitralily selected position in the scanning cycle. The marker 21 may be a radially extending signal flag from the wheel 19, a hole or slot in the wheel adjacent to its outer edge, for mechanical detection, or any other suitable marker for mechanically or photoelectrically causing a signal to be generated.

The "start" indicating detector 25 may acuually be positioned in the path of the laser beam itself, at a location which is only traversed once per cycle in the scanning sequence. In this case the rotating component may comprise a mirror scanning the beam 23. This is a simple and effective way of marking the "start" position in the cycle, for the purpose setting a reference point for switching of the return signal amplifier gain in accordance with the principles of the invention. The detector 25 may be located such that it does not interrupt the beam 23 during scanning, i.e. it is in a "dead space" between scan lines.

As indicated, the control device 12 may include a counter and decoder 27, which may by connected to a clock 29. From the "start" position as sensed by the position sensor 11, the counter and decoder 27 counts time via the clock 29 in accordance with known time duration for each scan line. The decoder of the device 27 accordingly sets the gain, through the gain switch 13, for each individual scan line. This may be done in accordance with known information respecting the characteristics of each scan line, including angles of the laser beam in the scan lines. Gain may also be set based on testing and calibration of the bar code reader assembly 10 in actual tests of reading bar codes on the various scan lines.

As shown in FIG. 1, the bar code reader assembly 10 includes a return signal detector 31 which is connected to an amplifier which may comprise the two amplifier components 15 and 16, connected on either side of the switched gain section or gain switch 13, The signal out from the amplifier, indicated as an arrow 33 in FIG. 1, is then conducted to digitizing circuitry (not shown), which may be of a type conventionally used in signal reading apparatus of a bar code reader.

Figure 2:
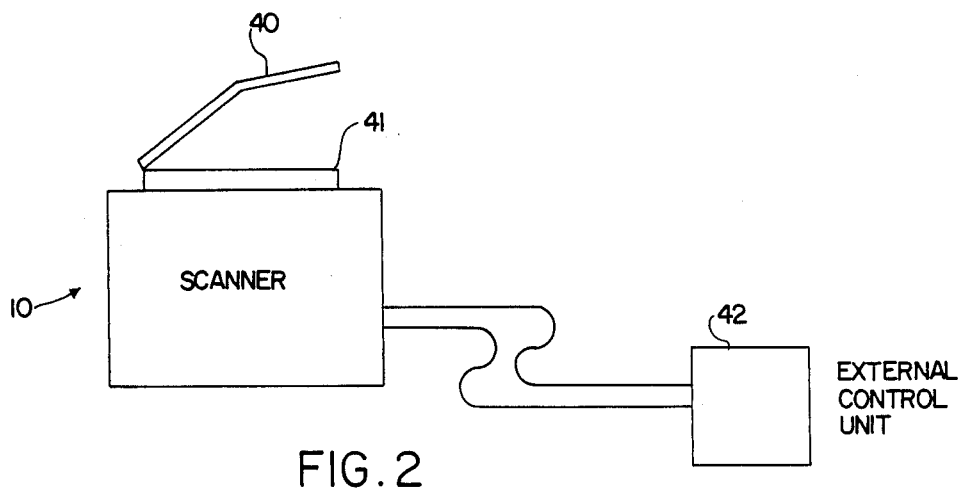
FIG. 2 is a schematic diagram indicating a calibration system or automatic gain level presetting system for setting the various gain levels for the gain switching of a laser scanner bar code reader.

FIG. 2 shows indicates schematically a calibration system for setting the gain for each scan line, preferably just after manufacture of the scanner 10. The purpose of this arrrangement is to make the calibration for gain adjustment automatic, avoiding the need for human decision as to how much the gain should be adjusted for each particular scan line.

During or just after production of the laser bar code scanner device 10, one or more special targets 40 may be place on a fixture 41 on the scanner. In FIG. 2 the target 40 is shown secured on top of the scanner, for the case of a supermarket type slot scanner, for example. The scanner unit 10 itself in this embodiment includes an electrically alterable memory, e.g. an "electrically alterable PROM". An external control unit 41 controls the electrically alterable memory and the gain switch 13 during calibration scanning of a sample test bar code on the target 40 and to adjust its own gains to get the best and most uniform reading of the target or targets 40. The scanner may be caused by the external control unit 42 to read a bar code with each scan line separately and sequentially, making comparisons of the signal strengths from all scan lines, and setting gain adjustments accordingly.

Once the gain levels have been set appropriately for each scan line, the electrically alterable memory is left set with the appropriate gain for each scan line. The scanner unit 10 is thus automatically calibrated.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a laser bar code scanner having a laser generating a beam, scanning means for moving the beam along more than one scan line, and a received signal amplifier for processing the signal received from the beam after reflecting off a bar code being read, an improved signal detection system, comprising:
   beam position detector means for detecting the position of the laser beam in a scanning sequence, and
   gain switching means for adjusting the gain of the received signal amplifier in accordance with the beam's position in the scanning sequence and with predetermined information regarding different signal strengths that can be expected at different beam positions in the scanning sequence,
   whereby a more uniform signal can be achieved in bar code reading on multiple scan lines.

2. The improvement according to claim 1, including means for determining shifts of the beam from one scan line to another, and means for actuating the gain switching means to set gain for each separate scan line by switching the gain with movements of the beam from one scan line to another.

3. The improvement according to claim 1, wherein the scanning means of the bar code scanner includes a rotating element, and wherein the beam position detector means includes means coupled to the rotating element for indicating position in the scanning sequence.

4. The improvement of claim 1, further including automatic calibration means for pre-setting gain for each scan line, including a calibration target fixture bearing a test bar code, for positioning in the path of all scan lines of the scanner, and external means connectible to the scanner for causing reading of the test bar code with each individual scan line separately and serially, and for comparing the return signal strengths from all the scan lines and setting the gain switching means so that a more uniform signal height will be produced among all scan lines.

5. The improvement of claim 4, wherein the bar code scanner includes an electrically alterable PROM and wherein the external means includes means includes means for enabling the electrically alterable PROM during scanning of the test bar code with each scan line separately, for adjusting and memorizing the gain levels automatically.

6. A method of compensating for variations in return signal strength in a laser bar code reader which scans a laser beam along more than one scan line, comprising,
   sensing a cycle "start" position in the scanning sequence,
   from the "start" position determining when the laser beam is on each respective scan line in the sequence,
   predicting variations in return signal strength for each respective scan line, based on predetermined information correlated to each scan line, and
   adjusting the gain of a return signal amplifier of the bar code reader for each scan line, in accordance with and in compensation for such predicted variations in return signal strength.

7. The method of claim 6, wherein the step of sensing a "start" position in the scanning sequence comprises detecting a signal flag position on a rotating element included in the scanning system of the bar code reader.

8. The method of claim 6, wherein the determination of the scan line includes timing the cycle with a clock.

9. The method of claim 6, wherein the determination of the scan line includes, following the identification of the "start" position, noting each shift to a new scan line photoelectrically.

10. A method of compensating for variations in return signal strength in a laser bar code reader which scans a laser beam along more than one scan line, comprising, determining the position of the beam in the scanning sequence, predicting variations in return signal strength for each respective scan line, based on predetermined information correlated to each scan line, and adjusting the gain of a return signal amplifier of the bar code reader, based on position of the beam in the scanning sequence, for each scan line, in accordance with and in compensation for such predicted variations in return signal strength.

* * * * *